US012434661B2

(12) United States Patent
Ilieva et al.

(10) Patent No.: US 12,434,661 B2
(45) Date of Patent: Oct. 7, 2025

(54) TCU REPLACEMENT SNITCH MODE

(71) Applicant: Ford Global Technologies, LLC, Dearborn, MI (US)

(72) Inventors: Elena Ilieva, Bloomfield Hills, MI (US); Simon John William Hurr, Grays (GB); John Robert Van Wiemeersch, Novi, MI (US); Yamen Taleb, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 18/409,242

(22) Filed: Jan. 10, 2024

(65) Prior Publication Data
US 2025/0222897 A1  Jul. 10, 2025

(51) Int. Cl.
| | |
|---|---|
| *B60R 25/10* | (2013.01) |
| *B60R 25/04* | (2013.01) |
| *B60R 25/102* | (2013.01) |
| *G07C 5/00* | (2006.01) |

(52) U.S. Cl.
CPC ........... *B60R 25/102* (2013.01); *B60R 25/04* (2013.01); *G07C 5/008* (2013.01)

(58) Field of Classification Search
CPC ........ B60R 25/102; B60R 25/04; G07C 5/008
See application file for complete search history.

(56) References Cited

U.S. PATENT DOCUMENTS

| | | | | |
|---|---|---|---|---|
| 7,042,346 | B2 * | 5/2006 | Paulsen | G07C 5/085 |
| | | | | 701/1 |
| 7,352,152 | B2 * | 4/2008 | Kawaguchi | H02J 7/0048 |
| | | | | 320/106 |
| 8,874,280 | B2 | 10/2014 | Doi et al. | |
| 10,632,965 | B1 * | 4/2020 | Wirtanen | B60R 25/102 |
| 11,620,861 | B2 * | 4/2023 | Yezersky | G06Q 30/0609 |
| | | | | 701/31.4 |
| 12,183,136 | B2 * | 12/2024 | Helman | G07C 9/20 |
| 2009/0256717 | A1 * | 10/2009 | Iwai | G06F 1/26 |
| | | | | 700/295 |
| 2010/0106345 | A1 * | 4/2010 | Hwang | G07C 5/008 |
| | | | | 701/2 |

(Continued)

FOREIGN PATENT DOCUMENTS

| | | |
|---|---|---|
| CN | 107615291 A | 1/2018 |
| CN | 114758432 A | 7/2022 |

(Continued)

*Primary Examiner* — Quang Pham
(74) *Attorney, Agent, or Firm* — Joseph Zane; Brooks Kushman P.C.

(57) ABSTRACT

An approach to managing mismatched controller alerts is disclosed. The approach includes storing, to a component database of a cloud system having one or more hardware computing devices, mismatched controller alerts received from a plurality of vehicles, each of the mismatched controller alerts indicating an identifier of a current vehicle that the mismatched controller is installed into, and a location of current vehicle. The approach further includes performing clustering of the mismatched controller alerts by the cloud system to correlate the mismatched controller alerts by location. The approach further includes indicating clustered locations of the mismatched controller alerts by the cloud system.

20 Claims, 6 Drawing Sheets

(56) References Cited

U.S. PATENT DOCUMENTS

| | | | | |
|---|---|---|---|---|
| 2010/0228404 | A1* | 9/2010 | Link, II | G06F 9/44542 |
| | | | | 701/1 |
| 2012/0049621 | A1* | 3/2012 | Shinoda | B60L 58/20 |
| | | | | 307/64 |
| 2012/0049785 | A1* | 3/2012 | Tanaka | B60L 53/305 |
| | | | | 320/106 |
| 2012/0049786 | A1* | 3/2012 | Kurimoto | H01M 10/4221 |
| | | | | 320/106 |
| 2016/0133063 | A1* | 5/2016 | Lim | G07C 5/0825 |
| | | | | 701/32.8 |
| 2016/0344747 | A1* | 11/2016 | Link, II | G06F 21/35 |
| 2018/0086306 | A1 | 3/2018 | Schmotzer et al. | |
| 2020/0334989 | A1 | 10/2020 | Nahle et al. | |
| 2021/0051000 | A1* | 2/2021 | Yang | H04L 63/123 |
| 2021/0377692 | A1* | 12/2021 | Yoo | B60R 25/245 |
| 2023/0072266 | A1* | 3/2023 | Steel | G07C 5/008 |
| 2023/0089171 | A1* | 3/2023 | Haga | G08G 1/22 |
| | | | | 726/4 |
| 2023/0169474 | A1* | 6/2023 | Hayashida | G06Q 10/20 |
| | | | | 705/308 |
| 2023/0286520 | A1* | 9/2023 | Qi | H04W 4/46 |
| 2023/0334913 | A1* | 10/2023 | Bonnington | G06Q 10/20 |
| 2024/0333330 | A1* | 10/2024 | Song | G08G 1/0175 |

FOREIGN PATENT DOCUMENTS

| | | |
|---|---|---|
| CN | 116339277 A | 6/2023 |
| DE | 102019124914 A1 | 3/2020 |
| DE | 102022112252 A1 | 11/2022 |
| EP | 2909065 B1 | 8/2020 |

\* cited by examiner

TCU REPLACEMENT SNITCH MODE

TECHNICAL FIELD

Aspects of the disclosure generally relate to a telematics control unit (TCU) replacement snitch mode.

BACKGROUND

As vehicles become more capable, connected, and valuable, thieves have updated their techniques to challenge existing cyber security and physical anti-theft systems. As such, automotive manufacturers may take additional measures resulting in an ongoing continuous growth of new anti-theft solutions need to match growing expertise by thieves. In one example, a TCU removal shield physical part may be installed over the TCU. The shield may be installed with break-away bolts made of hardened steel. These bolts may take 20-30 minutes to drill out, and when drilled may leave metal shavings that may introduce new issues resulting in need for vehicle repair. The shield may also add to the vehicle bill of materials, cost, and may add steps to warranty repair (e.g., labor and parts to install a new shield).

SUMMARY

In one or more illustrative examples, a cloud system for managing mismatched controller alerts includes a component database. The component database is configured to store mismatched controller alerts received from a plurality of vehicles. Each of the mismatched controller alerts indicates an identifier of a current vehicle that the mismatched controller is installed into and a location of current vehicle. The cloud system also includes one or more hardware computing devices. The one or more hardware computing devices are configured to perform clustering of the mismatched controller alerts to correlate the mismatched controller alerts by location, as well as to indicate clustered locations of the mismatched controller alerts.

In one or more illustrative examples, a method for managing mismatched controller alerts is performed. The method includes storing, to a component database of a cloud system having one or more hardware computing devices, mismatched controller alerts received from a plurality of vehicles, each of the mismatched controller alerts indicating an identifier of a current vehicle that the mismatched controller is installed into and a location of current vehicle. The method further includes performing clustering of the mismatched controller alerts by the cloud system to correlate the mismatched controller alerts by location. The method further includes indicating clustered locations of the mismatched controller alerts by the cloud system.

In one or more illustrative examples, a non-transitory computer-readable medium comprising instructions for managing mismatched controller alerts that, when executed by a cloud system having one or more hardware computing devices, cause the cloud system to perform operations including to store, to a component database, mismatched controller alerts received from a plurality of vehicles, each of the mismatched controller alerts indicating an identifier of a current vehicle that the mismatched controller is installed into and a location of current vehicle; perform clustering of the mismatched controller alerts by the cloud system to correlate the mismatched controller alerts by location; and indicate clustered locations of the mismatched controller alerts by the cloud system, including to send data indicative of the clustered locations to one or more of law enforcement to mitigate high crime areas or a vehicle insurance company for use in determining insurance rates.

DETAILED DESCRIPTION

Figure 1:
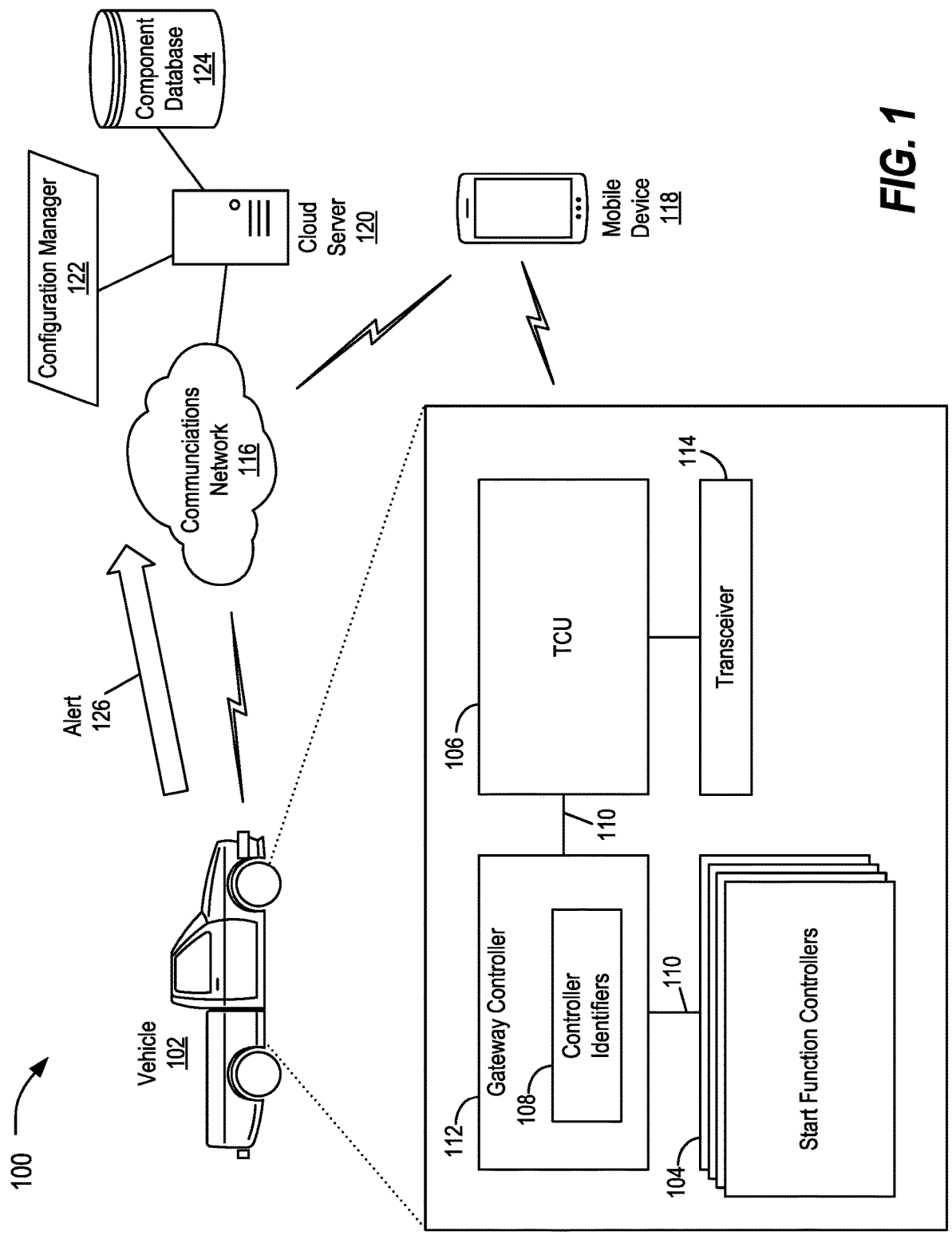
FIG. 1 illustrates an example system for implementing a TCU replacement snitch mode.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A mutual authentication scheme between a TCU and a powertrain control module (PCM) of a vehicle may be used to detect and prevent tampering with a vehicle. If TCU tampering is detected, the system may prevent internal combustion engine (ICE) start or torque availability for an electric vehicle (EV). This tampering detection may include recognition of one or more of issues, such as the TCU antenna is unplugged, the TCU antenna is compromised by shielding (e.g., significant loss of signal strength detected), the TCU Back-Up Battery (BUB) is removed, the TCU Fuse is pulled, and/or the TCU module itself is removed. However, the system may be incapable of detecting TCU replacement where these methods have been disabled.

Some of the above TCU conditions may occur for reasons other than a TCU attack. As such, an engine inhibit approach may turn a low severity loss of one or more connectivity functions into a high severity loss of primary vehicle function. For example, an improperly attached TCU connector or coax may result in loss of connectivity features that would also become a major issue due to loss of vehicle mobility and potentially greater repair expense. It may also appear random or intermittent to the customer and service tech and could generate additional unnecessary repairs and customer complaints.

A challenge of remove & replace (R&R) detection systems is that if the TCU R&R theft technique is performed with an electronic control unit (ECU) that is valid for that vehicle vintage, the system may be unable to detect the swapped TCU. One approach to combatting R&R theft methods is to pair the TCU with a plurality of vehicle modules or controllers (e.g., three or four controllers) using mutual authentication. In such an approach each of the controllers may be required to recognize one other for the start or other function to be allowed. Such an approach is more difficult to defeat, but it does not solve the issue as a malicious user may replace all the modules if given enough time. Or, the malicious user may use a tow truck, take the vehicle to a more private area, and replace the parts to bring the vehicle back to an operational state for sale.

An enhanced approach may be implemented by the vehicle to mitigate issues with TCU-to-controller verification strategies. The approach may be implemented by the TCU and/or PCM, or any other modules added to the mutual authentication. The approach may store a history of the vehicle identification number (VIN) of any vehicle in which they operated, and optionally the last install date. Even if a malicious user installs valid vintage hardware to the vehicle for a R&R based theft, this enhanced approach may recognize the mismatch and may use the malicious user's own TCU to send a message to the original equipment manufacturer (OEM) or other party to aid in recovering the vehicle.

It may be possible for a malicious user to read a VIN off the vehicle that is targeted and use this VIN to reprogram the R&R parts before performing the R&R theft. However, the install records for the vehicle would not match the OEM history records. Up to that date, there would be a record install date for a TCU and/or PCM of the vehicle that would not match the R&R event that was performed (e.g., performed without dealer or repair shop involvement which would have updated the history records).

Responsive to the system detecting that start function components have been replaced with components that are unauthorized for the specific vehicle, the TCU may send an alert (e.g., to a cloud server) that foreign vehicle components have been detected. This information may include identification of such components as well as an identifier of the originating vehicle (e.g., VIN) or that the component was in service stock and never installed in a vehicle. The current location of the vehicle may also be included, as well as the ability to continue collecting location information for the next day or other predefined periods of time, similar to early theft alerts.

Thus, responsive to identification of the foreign components as having been installed to the vehicle, the vehicle may be inhibited and/or immobilized. Additionally, an alert may be sent from the vehicle to a cloud server. Some examples of where this alert can be utilized are in anti-theft packages for retail vehicles, and for fleets as part of owner alerts. Providing such alerts may also be useful for retrieval and discovery of additional vehicles that may have also been taken or modified. The alerts may also be useful for insurance companies in gauging rates for various locations. In some examples, a database may be built for various OEMs or other entities to collect the alerts and contribute to catching malicious users that steal various vehicles at similar locations. Location may accordingly be leveraged in understanding the patterns in theft and location vulnerability.

In some examples, an override option may also be placed in the vehicle owner's application account, to allow the user to bypass the TCU override. This may be done, for example, through a multiple-factor approval process and/or through use of security recovery questions.

Thus, by placing an element of the security system off-board from the vehicle, the system may become more immune to part swapping. Additionally, by making the TCU smart such that it requests approval to be in the selected vehicle based on build information, not just part vintage, increases the ability to ensure that genuine and/or correct replacement parts are used in the vehicle.

FIG. 1 illustrates an example control system 100 for implementing a TCU replacement snitch mode. As shown, the control system 100 includes a vehicle 102. The vehicle 102 includes a plurality of start function controllers 104 and a TCU 106. Each of the start function controllers 104 and the TCU 106 may be assigned a respective unique controller identifier 108 and may be associated with the VIN of the vehicle 102. The TCU 106 and start function controllers 104 may be in communication over various vehicle buses 110 with a gateway controller 112. The TCU 106 may use a wireless transceiver 114 to communicate these controller identifiers 108 and other information over a communications network 116. In other examples, the gateway controller 112 may utilize the services of a mobile device 118 for communication over the communications network 116. A cloud server 120 may be connected to the communications network 116 and may host a configuration manager 122 and a component database 124. The gateway controller 112 may be configured to validate that the controller identifiers 108 of the start function controllers 104 and TCU 106 match the expected configuration of the vehicle 102. In cases where the configuration is not a match, the gateway controller 112 may send a mismatched controller alert 126 over the communications network 116 to the cloud server 120. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only. For title, inventory, and other purposes, vehicles 102 may be associated with unique identifiers, such as VINs, e.g., as defined by International Organization for Standardization (ISO) 3779 and ISO 4030.

The vehicle 102 may include a plurality of controllers configured to perform and manage various vehicle 102 functions. In particular, these controllers may include, but not be limited to one or more start function controllers 104. As referred to herein, the start function controllers 104 refer to a subset of components of the vehicle 102 that are validated before allowing the vehicle 102 to be started. In an example, the start function controllers 104 may include one or more of the PCM, a body control module (BCM), an anti-lock braking system (ABS) controller, and the TCU 106. In another example, the start function controllers 104 may include a motion subsystem including ac combined BCM/PCM/ABS start function controller 104.

As depicted, the start function controllers 104 are represented as discrete components. However, the start function controllers 104 may share physical hardware, firmware, and/or software, such that the functionality from multiple start function controllers 104 may be integrated into a single start function controller 104 or distributed across a plurality of start function controllers 104. The vehicle start function controllers 104 may include various components configured to receive updates of associated software, firmware, or configuration settings.

The TCU 106 may be configured to provide telematics services to the vehicle 102. These services may include, as some non-limiting possibilities, navigation, turn-by-turn directions, vehicle health reports, local business search, accident reporting, and hands-free calling.

The controller identifiers 108 may refer to unique identifiers that are assigned to the start function controllers 104 and TCU 106 when the start function controller 104 and TCU 106 are produced. Each start function controller 104 and TCU 106 may be assigned to a unique, different controller identifier 108. For instance, each of the start function controllers 104 and TCUs 106 may be assigned to an electronic serial number (ESN) when the start function controller 104 is built.

The TCU 106 may be configured to utilize a wireless transceiver 114 to communicate with a communications network 116. The communications network 116 may provide communications services, such as packet-switched network services (e.g., Internet access, voice over internet protocol (VOIP) communication services), to devices connected to the communications network 116. For instance, the TCU 106 may access the communications network 116 via connection to one or more cellular towers. To facilitate the communications over the communications network 116, the TCU 106 may be associated with unique device identifiers (e.g., mobile device numbers (MDNs), Internet protocol (IP) addresses, etc.) to identify the communications of the TCU 106 on the communications network 116 as being associated with the vehicle 102.

The TCU 106 may include network hardware configured to facilitate communication between the vehicle 102 and other devices of the system 100. For example, the TCU 106 may include or otherwise access a wireless transceiver 114 configured to facilitate communication with other vehicles 102 or with infrastructure. The TCU 106 may, accordingly, be configured to communicate over various protocols over communications network 116 over a network protocol (such as Uu, User-to-user). The TCU 106 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different wireless, peer-to-peer, and/or cellular technologies may be used for vehicle-to-vehicle communication. As some other examples, BLUETOOTH, Ultra-Wideband (UWB), and/or Wi-Fi communication may be performed between the vehicles 102.

The vehicle buses 110 may include various methods of communication available between the start function controllers 104. The vehicle buses 110 may also support communication between the gateway controller 112, the TCU 106, and the start function controllers 104. These vehicle buses 110 may be implemented as a series of segments of wiring. For instance, a vehicle bus 110 may include a plurality of segments of wiring from the gateway controller 112 to an end location. As some non-limiting examples, the vehicle bus 110 may be a vehicle controller area network (CAN), an Ethernet network, or a media oriented system transfer (MOST) network. The CAN network or networks may be various types, including, but not limited to, high speed CAN (HS-CAN) having a data capacity of up to 500 kbps, mid-speed CAN (MS-CAN) having a data capacity of up to 125 kbps, and/or CAN flexible data rate (FD-CAN) having a data capacity of up to 2000 kbps or higher. It should be noted that the illustrated bus topology is merely an example, and other numbers and arrangements of vehicle buses 110 may be used.

The gateway controller 112 may be configured to provide an electrical interface between the vehicle buses 110 used to communicate within the vehicle 102. In an example, the gateway controller 112 may be configured to route signals from one CAN bus to another CAN bus. In another example, the gateway controller 112 may be configured to translate signals and commands between CAN and/or in-vehicle Ethernet vehicle buses 110 connected to the gateway controller 112. The gateway controller 112 may implement other functionality as well, such as a user interface between the vehicle 102 and the user's brought-in smartphone or other mobile device 118.

The gateway controller 112 may be further configured to provide computing functionality in support of the domain CAN messaging of the vehicle 102. The gateway controller 112 may be configured to route information between the various vehicle buses 110 connected to the gateway controller 112. The gateway controller 112 may include software code programmed to support the configuration verification functionality discussed in detail herein.

The gateway controller 112 may be configured to store controller identifiers 108 of the start function controllers 104 of the vehicle 102. For instance, each of the start function controllers 104 may be assigned to an ESN when the start function controller 104 is built. This ESN may serve as a unique identifier of the start function controllers 104. In another example, the controller identifiers 108 may include the originating VIN of the vehicle 102 with which the start function controller 104 was originally built to be installed into. This originating VIN and/or the ESN may be flashed into non-volatile memory of the start function controller 104 and/or TCU 106 when built.

The cloud server 120 may be an example of a networked computing device that is accessible to the vehicle 102 over the communications network 116. A configuration manager 122 may be an example of an application executed by the cloud server 120. The configuration manager 122 may be configured to perform one or more of the operations discussed herein, e.g., with respect to the operation of the cloud server 120 for data transfer to and from the vehicles 102.

The cloud server 120 may be configured to maintain a component database 124. The component database 124 may include information with respect to the controller identifiers 108 of each of the start function controllers 104 of the vehicles 102.

The component database 124 may maintain location information with respect to the vehicles 102. In one approach, the cloud server 120 may receive location of the vehicle 102 from the communications network 116. This information may, for instance, be based on a home location database of the communications network 116 that maintains information indicative of which cells of the communications network 116 are connected to the TCUs 106 of which vehicles 102. In another example, the vehicles 102 may report their locations to the cloud server 120, e.g., by using a global navigation satellite system (GNSS) controller of the vehicle 102 to identify the location of the vehicle 102 and send that information by the TCU 106 over the communications network 116 to the cloud server 120. Regardless of approach, the cloud server 120 may receive this location information over the communications network 116 and may store that information in the component database 124.

As noted above, the gateway controller 112 may be configured to validate that the controller identifiers 108 match the expected configuration of the vehicle 102. In cases where the configuration is not a match, the gateway controller 112 may send a mismatched controller alert 126 over the communications network 116 to the cloud server 120. For example, in the case of a replaced TCU 106, the mismatched controller alert 126 may specify the following information:

a. TCU [ESN ********]
    b. from originating vehicle [VIN ********]
    c. has been found in vehicle [VIN ********]
    d. with missing original TCU [ESN *********]

Similar information may be provided in the mismatched controller alert 126 for other replaced start function controllers 104. The mismatched controller alert 126 can be communicated to nearby vehicles 102 via various approaches, such as via Wi-Fi, via BLUETOOTH Low Energy (BLE), via ultra-wideband (UWB), while in parallel also being sent to the OEM cloud via Cellular/Wi-Fi. If any current devices are connected (such as a mobile phone), those devices may also be leveraged to send the mismatched controller alert 126 to the cloud. Thus, the vehicle 102 may send the information to the OEM cloud using the TCU 106 or may leverage the customer's connected phone to send the information to the OEM cloud.

Figure 2A:
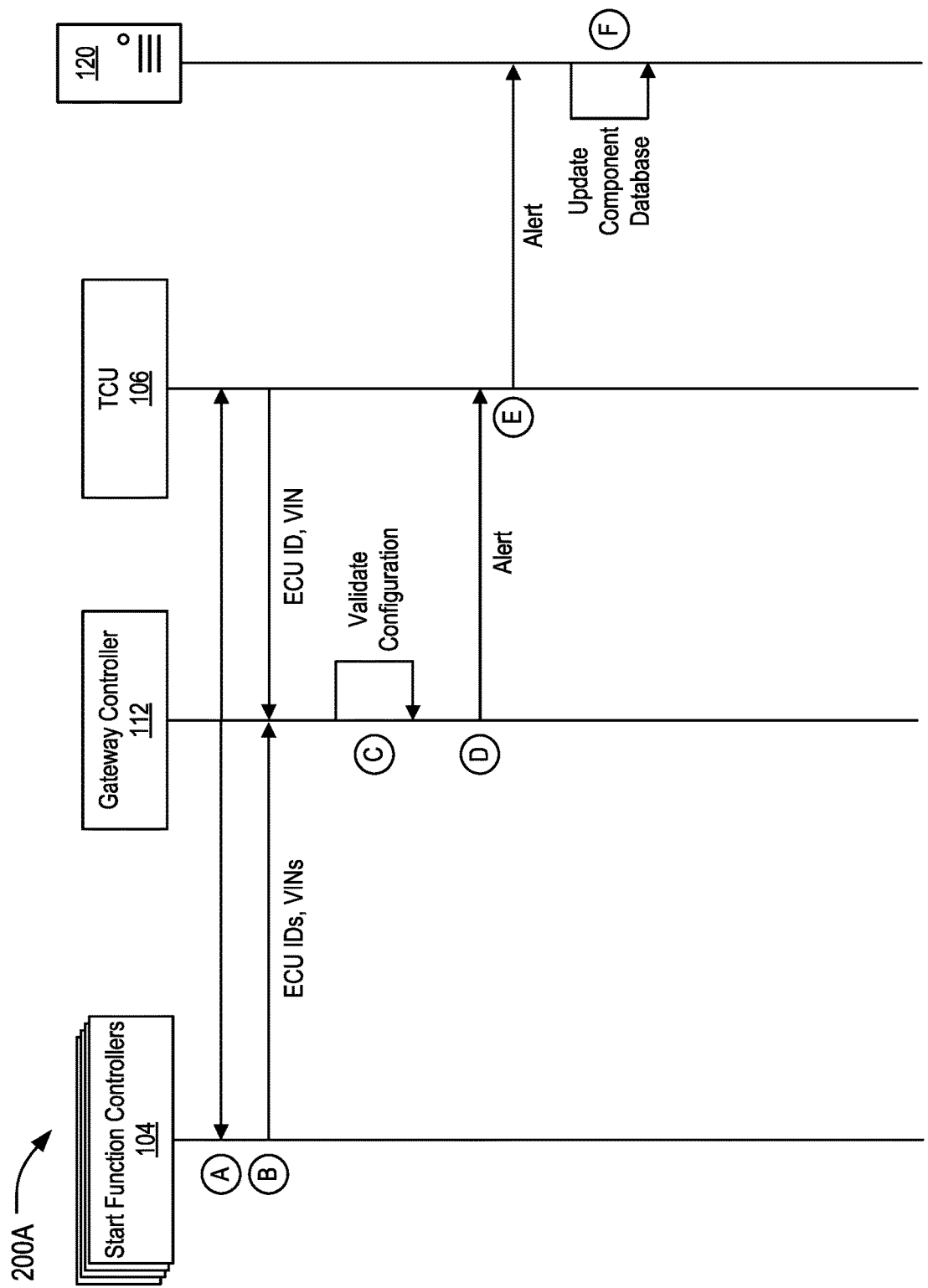
FIG. 2A illustrates an example data flow for providing controller identifier to the component database managed by the configuration manager of the cloud server.

FIG. 2A illustrates an example data flow 200A for providing controller identifier 108 to the component database 124 managed by the configuration manager 122 of the cloud server 120. In an example, the data flow 200A may be performed by the elements of the system 100 discussed with respect to FIG. 1.

At index (A), the gateway controller 112 requests controller identifiers 108 responsive to a start of the vehicle 102. This start may be initiated in various ways, such as responsive to a user pressing the start button in the cabin of the vehicle 102, responsive to the user selecting a remote start button from a key fob or a phone-as-a-key application, etc. In an example, the gateway controller 112 may send a message over the vehicle buses 110 to the start function controllers 104 and to TCU 106 requesting controller identifiers 108 of the start function controllers 104 and TCU 106. These controller identifiers 108 may be used to validate the configuration of the vehicle 102. The controller identifiers 108 may also include, in some examples, the VIN of the vehicle 102 for which the start function controllers 104 and/or TCUs 106 are intended to be connected. It should be noted that in some examples the gateway controller 112 may be activated based on start messaging sent over the vehicle buses 110 from another controller (such as via the BCM, PCM, etc.). In such an example, the sending of the controller identifiers 108 may be triggered based on that other controller as opposed to being specifically requested by the gateway controller 112.

At index (B), the gateway controller 112 receives the controller identifiers 108. This information may be received by the gateway controller 112 over the vehicle buses 110. For instance, the gateway controller 112 may listen in on the vehicle buses 110 to receive the controller identifier 108 to validate the configuration. The gateway controller 112 may accordingly receive the originating VIN and/or ESNs of the start function controllers 104 and TCU 106 over the vehicle buses 110. The gateway controller 112 may also listen for location information indicative of the current location of the vehicle 102, which may be received over the vehicle bus 110 from a GNSS controller, for example (regardless of whether the GNSS controller is a start function controller 104).

At index (C), the gateway controller 112 validates the controller identifiers 108 received at index (B). For example, the gateway controller 112 may maintain a configuration of the last known good controller identifiers 108 for the vehicle 102. Using the stored controller identifiers 108, the gateway controllers 112 may confirm that none of the start function controllers 104 or the TCU 106 have been swapped since the last start of the vehicle 102. For instance, the gateway controller 112 may confirm that the originating VINs of the start function controllers 104 and TCU 106 match that of the gateway controller 112 and/or of other components of the vehicle 102. Additionally, or alternately, the gateway controller 112 may confirm that the ESNs of the start function controllers 104 and TCU 106 match that as recorded in storage of the gateway controller 112.

At index (D), if a mismatch is detected at index (C) by the gateway controller 112, the gateway controller 112 may send a mismatched controller alert 126. This mismatched controller alert 126 may include the ESN, VIN, and location information as noted above. In the example shown in the data flow 200A, the mismatched controller alert 126 is instructed by the gateway controller 112 to the TCU 106.

At index (E), the TCU 106 sends the mismatched controller alert 126 to the cloud server 120. Significantly, the mismatched controller alert 126 may be sent even if the TCU 106 is the component that is noted as not matching the vehicle 102.

At index (F), the cloud server 120 stores the information from the mismatched controller alert 126 into the component database 124. Further aspects of the analysis by the cloud server 120 of the component database 124 are discussed below.

Figure 2B:
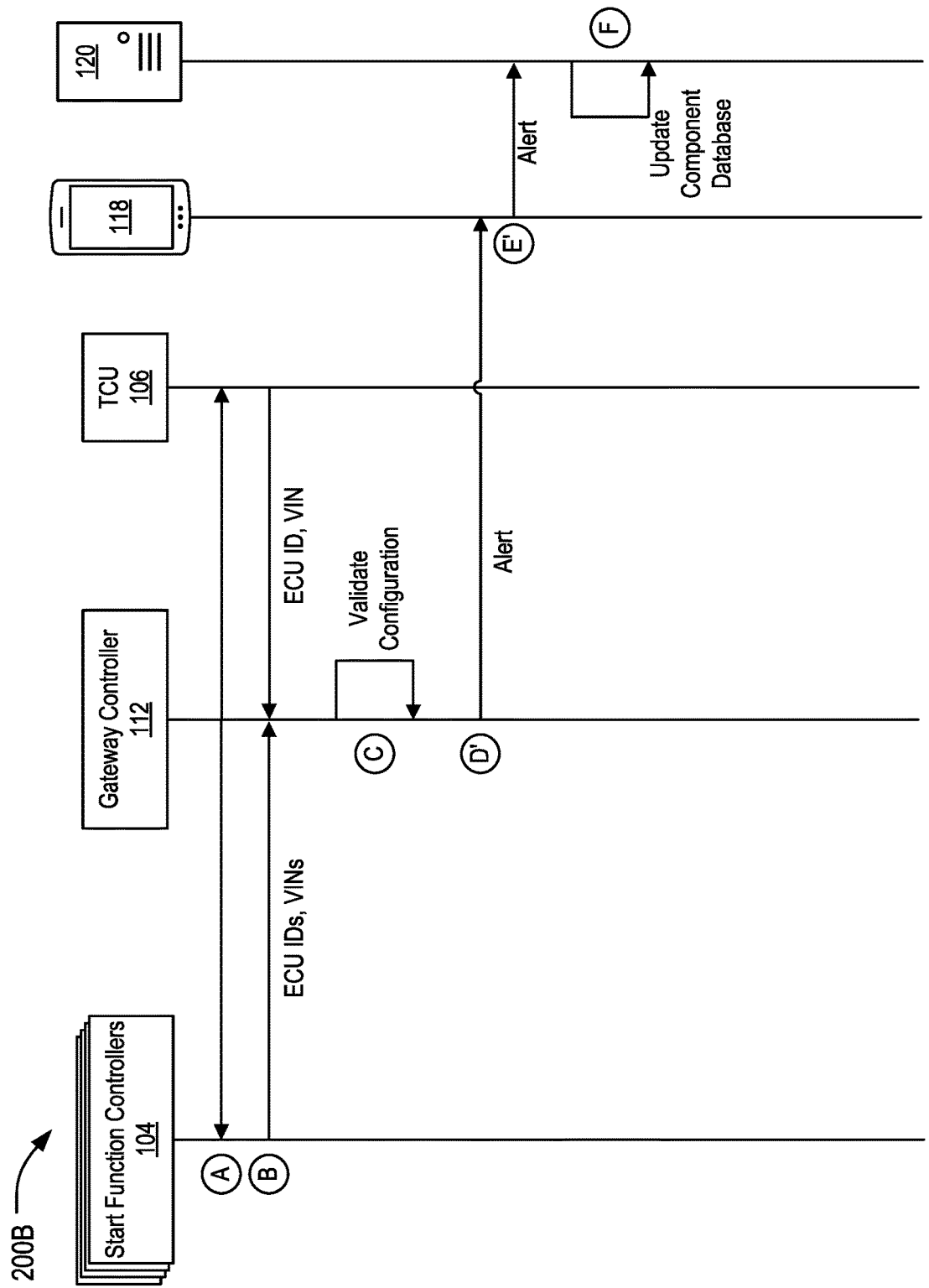
FIG. 2B illustrates an alternate example data flow for providing controller identifier to the component database managed by the configuration manager of the cloud server.

FIG. 2B illustrates an alternate example data flow 200B for providing controller identifier 108 to the component database 124 managed by the configuration manager 122 of the cloud server 120. In the alternate example data flow 200B, the operations at indexes (A), (B), (C), and (F) may be performed as discussed for the data flow 200A. However, different from the data flow 200A, the data flow 200B at indexes (D') and (E') may utilize the mobile device 118 to send the mismatched controller alert 126, as opposed to using the services of the TCU 106.

At index (D') the gateway controller 112 instructs the mobile device 118 to send the mismatched controller alert 126 over the communications network 116 to the cloud server 120. This may be accomplished without the vehicle 102 having to resort to use of the TCU 106. For instance, if the TCU 106 is noted as being the component that does not belong with the vehicle 102, then another communications path may be preferred in case the TCU 106 is otherwise compromised. Thus, the approach of the data flow 200B may be preferred over that of the data flow 200A in instances where the TCU 106 is the mismatched controller. At index (E'), the mobile device 118 accordingly forwards the mismatched controller alert 126 to the cloud server 120 over the communications network 116.

As a further variation, the gateway controller 112 may connect to other vehicles 102, mobile devices 118, Wi-Fi connections, etc., to send the mismatched controller alerts 126. In such an approach, the vehicle 102 may use multiple channels to send the mismatched controller alert 126 even if the TCU 106 is replaced with a unit that does not provide for mismatched controller alert 126 functionality.

Figure 3:
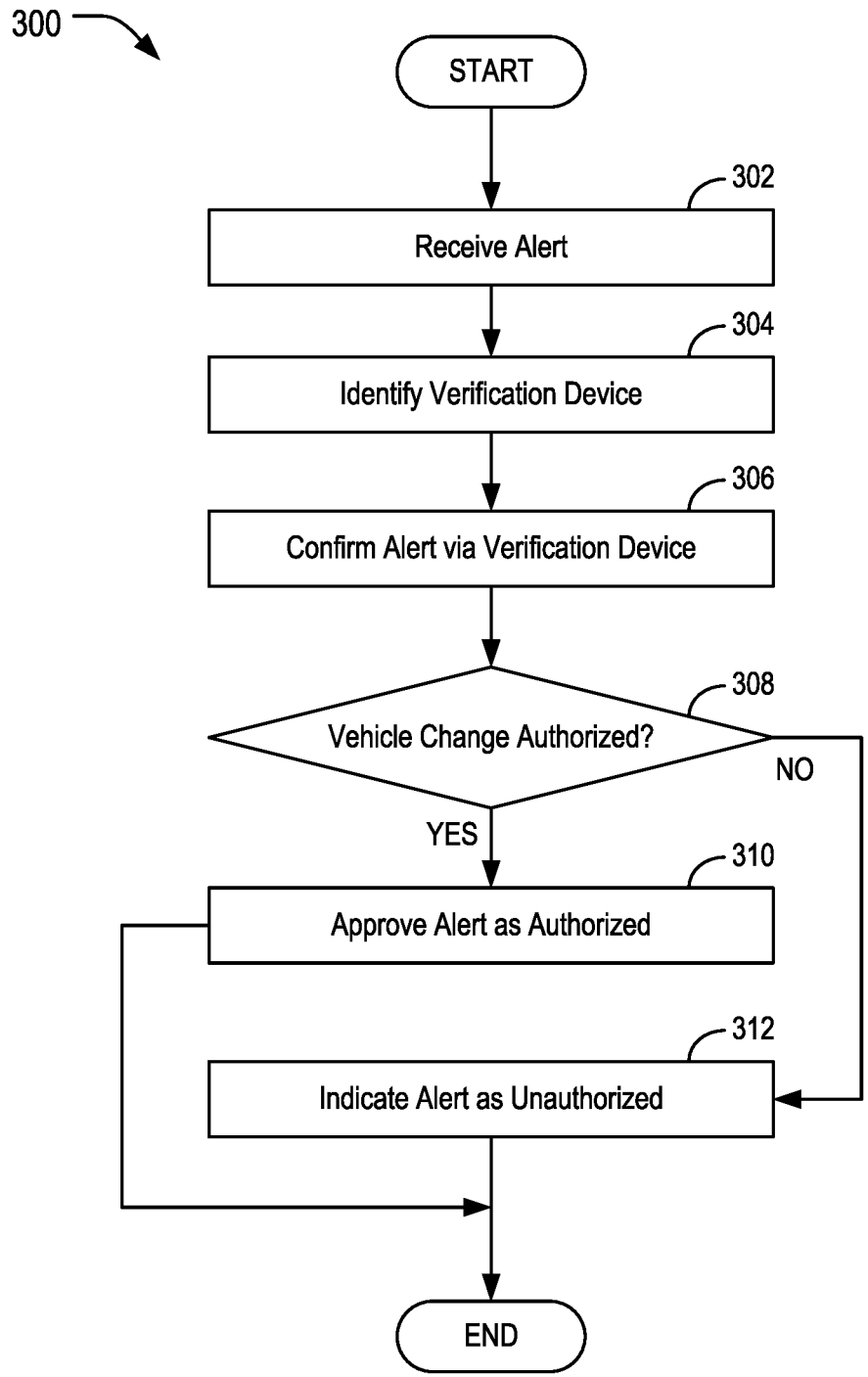
FIG. 3 illustrates an example process for the validating alert messages by the cloud server.

FIG. 3 illustrates an example process 300 for the validating mismatched controller alert 126 messages by the cloud server 120. In an example, the process 300 may be performed by the cloud server 120 executing the configuration manager 122 in the context of the control system 100.

At operation 302, the cloud server 120 receives a mismatched controller alert 126. In an example, the mismatched controller alert 126 may be generated by the gateway controller 112 responsive to the gateway controller 112 having detected a change in the configuration of the vehicle 102. The mismatched controller may be a start function controller 104 or TCU 106 of the current vehicle 102 that is validated by the current vehicle 102 before allowing the current vehicle 102 to be started. As some specific possibilities, the start function controller 104 may be one or more of the PCM, a BCM, or the ABS controller. Examples of the generation and sending of the mismatched controller alerts 126 are shown in FIGS. 2A-2B.

The mismatched controller alert 126 may be received to the cloud server 120 over the communications network 116 from the TCU 106, from the mobile device 118, and/or via a Wi-Fi channel of communication from the gateway controller 112 of the vehicle 102. It should be noted that the alert may be sent from the vehicle 102 using the TCU 106, despite the TCU 106 being the mismatched controller. In another example, wherein the mismatched controller alert 126 is sent from the current vehicle 102 to the cloud system from a mobile device 118 in communication with the current vehicle 102, without using the TCU 106 of the current vehicle 102. In yet another example, the mismatched controller alert 126 is sent from the current vehicle 102 to the cloud system from a Wi-Fi connection communication with the current vehicle 102, without using the TCU 106 of the current vehicle 102.

The mismatched controller alert 126 may include information such as the VIN of the vehicle 102, the ESN and/or associated VIN of the start function controller 104 or TCU 106 that was not a match, and the ESN that was expected for the mismatched start function controller 104 and/or the TCU 106. The vehicle 102 sending the mismatched controller alert 126 may have been immobilized by the gateway controller 112 due to detection of the mismatched controller.

At operation 304, the cloud server 120 identifies a verification device to confirm the mismatched controller alert 126. In an example, the cloud server 120 may access the component database 124 or another database or service to identify a verification device (e.g., mobile device 118) of a user account corresponding to the VIN of the vehicle 102 for which the mismatched controller alert 126 was received. In another example, the cloud server 120 may access the component database 124 or another database or service to identify a dealer device that corresponds to a dealer or other repair facility that performed service to the vehicle 102. For instance, the vehicle 102 is at a dealer or authorized repair shop, the dealer many have sent a message to the cloud server 120 indicating that service is being performed.

At operation 306, the cloud server 120 confirms the mismatched controller alert 126 via the verification device. In an example, the cloud server 120 may send a verification message to a mobile device 118 of the user, e.g., via the user's phone-as-a-key or other connected mobile application installed to the mobile device 118. In another example, the cloud server 120 may send the mismatched controller alert 126 to the dealer device for confirmation.

At operation 308, the cloud server 120 determines whether the vehicle change indicated by the mismatched controller alert 126 is authorized. For example, the user may utilize the mobile application to confirm that the change in the vehicle 102 was authorized or indicate that the change was not authorized. Or, the dealer may use the dealer system to confirm that the change in the vehicle 102 was authorized, or indicate that the change was not authorized. If the user or dealer indicates the change is authorized, control passes to operation 310. If not, control passes to operation 312.

At operation 310, the cloud server 120 approves the mismatched controller alert 126 as being authorized. For example, the vehicle 102 configuration may be updated at the component database 124 to include the new ECU/TCU etc. In another example, if the vehicle 102 determined itself to be immobilized due to the configuration change, the vehicle 102 may be mobilized again to allow for the vehicle 102 to be used.

At operation 312, the cloud server 120 indicates that the mismatched controller alert 126 is not authorized. For example, the vehicle 102 configuration may be updated at the component database 124 to indicate the location of the vehicle 102 at the mismatched controller alert 126 as well as to continue tracking the location of the vehicle 102 while in the mismatched controller alert 126 status. In another example, the vehicle 102 may be immobilized, e.g., by the vehicle 102 receiving a confirmation from the cloud server 120 that the change is not authorized. In other examples however, the vehicle 102 may have already been immobilized by the self-check performed by the gateway controller 112. After operations 310 or 312, the process 300 ends.

Figure 4:
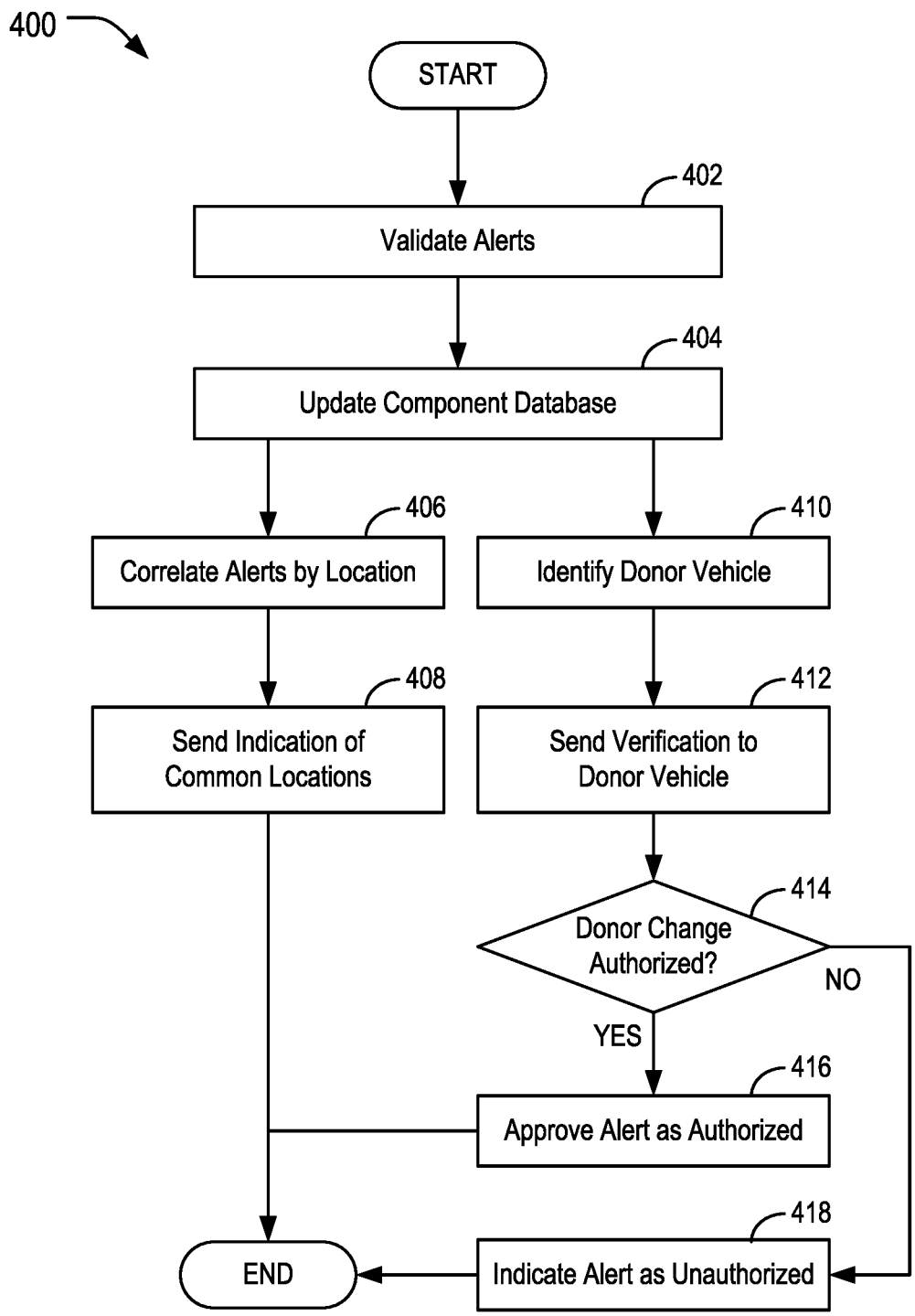
FIG. 4 illustrates an example process for the analysis of multiple alerts by location to determine trends in alert generation.

FIG. 4 illustrates an example process 400 for the analysis of multiple mismatched controller alerts 126 by location to determine trends in mismatched controller alert 126 generation. In an example, as with the process 300, the process 400 may be performed by the cloud server 120 executing the configuration manager 122 in the context of the control system 100.

At operation 402, the cloud server 120 validates the mismatched controller alerts 126. In an example, these mismatched controller alerts 126 are received and confirmed as discussed with respect to operation 302.

At operation 404, the cloud server 120 stores the mismatched controller alert 126 to the component database 124. In an example, the mismatched controller alerts 126 may be stored as records in the component database 124 with fields available for query such as location of mismatched controller alert 126, VIN of vehicle 102 sending mismatched controller alert 126, ESN of newly found component, VIN of newly found component, ESN of expected component, etc. The records of the component database 124 may accordingly be configured to store mismatched controller alerts 126 received from a plurality of vehicles 102, each of the mismatched controller alerts 126 an identifier of a current vehicle 102 that the mismatched controller is installed into and a location of the current vehicle 102. The mismatched controller alerts 126 may further include an identifier of an originating vehicle 102 into which the mismatched controller was previously installed. (It should be noted that in some examples, the mismatched controller may have come from service stock and may never have been installed in a vehicle. This could be detected as well, based on the cloud server 120 having knowledge of the controllers in inventory.)

At operation 406, the cloud server 120 correlates the mismatched controller alerts 126 by location. In an example, the cloud server 120 may perform clustering techniques on the location data of the records of the component database 124. This may be performed to identify common locations of the mismatched controller alerts 126. Example clustering techniques for clustering the locations may include K-means clustering, density-based spatial clustering of applications with noise (DBSCAN), hierarchical clustering, etc. In some examples, the cloud server 120 may attempt to identify the clustered locations using map data, e.g., to determine what business, parking lot, etc. is located at the clustered location.

At operation 408, the cloud server 120 sends indications of the clustered locations. In an example, the locations may be sent to law enforcement to investigate behavior at the indicated locations, e.g., to attempt to locate malicious users swapping the start function controllers 104 and/or TCU 106. In another example, the locations may be sent to insurance providers to allow for the updating of insurance premiums in the vicinity of the clustered locations, e.g., to indicate the increased likelihood of theft or damage to the vehicle 102 in those areas.

At operation 410, also based on the component database 124 updated at operation 404, the cloud server 120 may identify the donor vehicle 102 of the mismatched controller alert 126. In an example, the mismatched controller alert 126 may include information indicative of the VIN of the vehicle 102 from which the added start function controller 104 and/or TCU 106 was originally installed. Similar to operation 304, the cloud server 120 may access the component database 124 or another database or service to identify a user account corresponding to the VIN of the donor vehicle 102 indicated by the mismatched controller alert 126.

At operation 412, the cloud server 120 sends a verification message to a mobile device 118 corresponding to the donor vehicle, e.g., via the donor vehicle user's phone-as-a-key or other connected mobile application installed to the mobile device 118. In another example, if the donor vehicle 102 is or was previously at a dealer or authorized repair shop, the dealer many have sent a message to the cloud server 120 indicating that service is being performed. In such an instance, the cloud server 120 may query that dealer for confirmation regarding the provenance of the removed component.

At operation 414, the cloud server 120 determines whether the vehicle change indicated by the mismatched controller alert 126 is authorized. For example, the donor user may utilize the mobile application to confirm that the change in the vehicle 102 was authorized or, in the alternative, indicate that the change was not authorized. Or the dealer may use the dealer system to confirm that the change in the donor vehicle 102 was authorized, or indicate that the change was not authorized. If the user or dealer indicates the change to the donor was authorized, control passes to operation 416. If not, control passes to operation 418.

At operation 416, the cloud server 120 approves the mismatched controller alert 126 as being authorized. For example, the vehicle 102 configuration may be updated at the component database 124 to include the donor ECU/TCU as being properly installed. In another example, if the vehicle 102 determined itself to be immobilized due to the configuration change, the vehicle 102 may be mobilized again to allow for the vehicle 102 to be used, despite the inclusion of the donor component.

At operation 418, the cloud server 120 indicates that the mismatched controller alert 126 is not authorized. For example, the cloud server 120 may track the locations of the vehicle 102 and/or the donor vehicle to identify where the swap may have occurred. In another example, the vehicle 102 and/or the donor vehicle may be immobilized, e.g., to prevent use of either vehicle involved in the unauthorized swap operation. In other examples however, the vehicle 102 may have already been immobilized by the self-check performed by the gateway controller 112. After operations 310 or 312, the process 300 ends.

Figure 5:
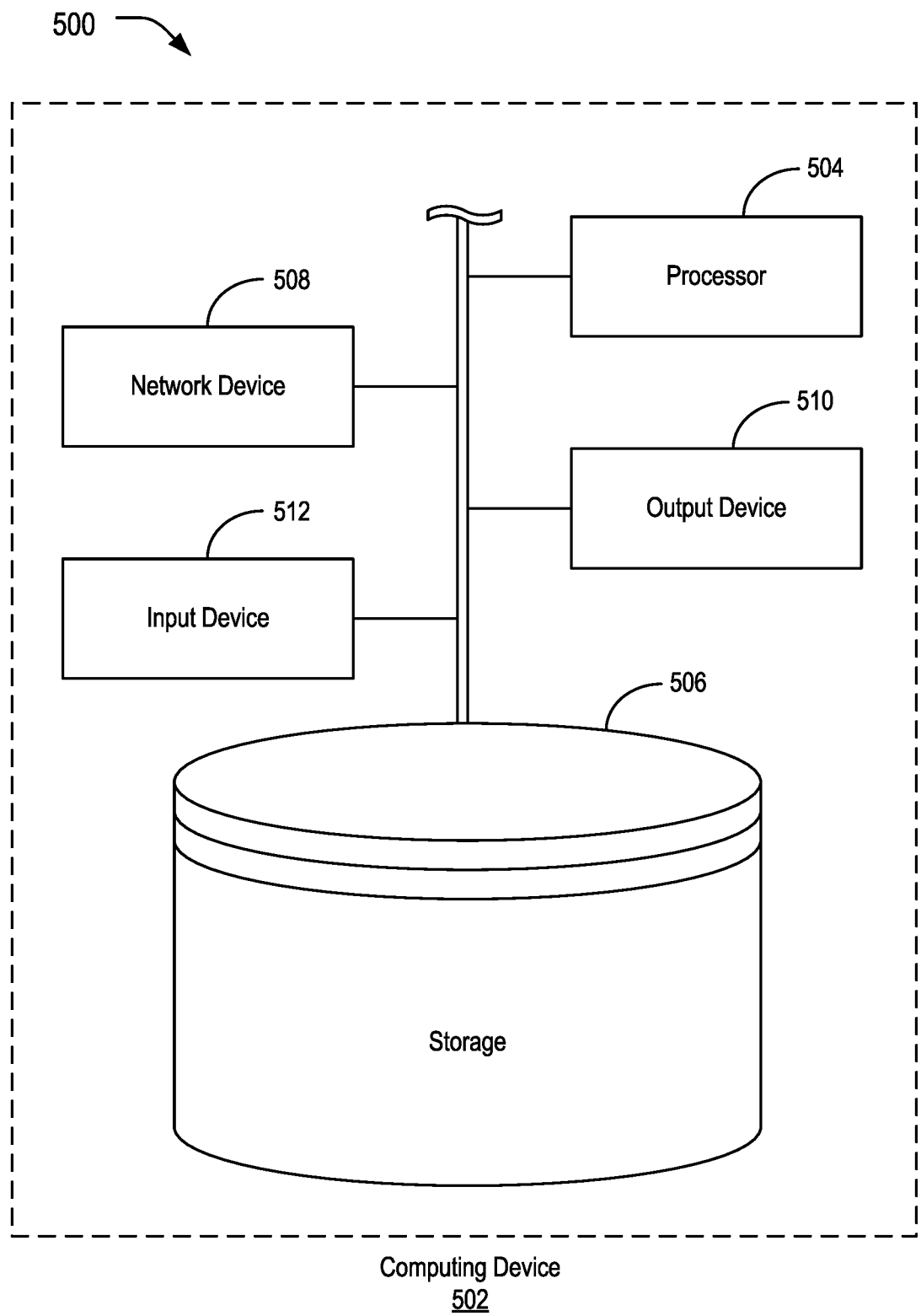
FIG. 5 illustrates an example of a computing device for use in implementing a TCU replacement snitch mode.

FIG. 5 illustrates an example 500 of a computing device 502 for use in implementing a TCU 106 replacement snitch mode. Referring to FIG. 5, and with reference to FIGS. 1-4, the vehicles 102, start function controllers 104, TCU 106, gateway controller 112, wireless transceiver 114, communications network 116, mobile device 118, and cloud server 120 may be examples of such computing devices 502. As shown, the computing device 502 includes a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 504 executes stored program instructions that are retrieved from the storage 506, such as those of the configuration manager 122. The stored program instructions accordingly include software that controls the operation of the processors 504 to perform the operations described herein. The storage 506 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the control system 100. Examples of data stored to the storage 506 may include the controller identifier 108, VINs, information included in the component database 124, mismatched controller alerts 126, etc.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the vehicles 102 to send and/or receive data from external devices over networks. Examples of suitable network devices 508 include an Ethernet interface, a Wi-Fi transceiver, a cellular transceiver, or a BLUETOOTH or BLE transceiver, an UWB transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cloud system for managing mismatched controller alerts, comprising:
   a component database configured to store mismatched controller alerts received from a plurality of vehicles, each of the mismatched controller alerts indicating an identifier of a current vehicle that a mismatched controller is installed into and a location of the current vehicle responsive to the current vehicle identifying a mismatch of an identifier of the mismatched controller with an expected configuration of the current vehicle; and
   one or more hardware computing devices, configured to:
      perform clustering of the mismatched controller alerts to correlate the mismatched controller alerts by location, and
      indicate clustered locations of the mismatched controller alerts.

2. The cloud system of claim 1, wherein the mismatched controller is a start function controller of the current vehicle that is validated by the current vehicle before allowing the current vehicle to be started.

3. The cloud system of claim 1, wherein each of the mismatched controller alerts further indicates an identifier of an originating vehicle into which the mismatched controller was previously installed.

4. The cloud system of claim 1, wherein the one or more hardware computing devices are further configured to:
receive an alert from the current vehicle, the current vehicle being immobilized due to a detection of the mismatched controller,
identify a verification device corresponding to the current vehicle,
confirm the alert by sending a message to the verification device requesting authorization for installation of the mismatched controller, and
responsive to the mismatched controller being installed into the current vehicle being confirmed as being authorized, send a message to the current vehicle to cause the current vehicle to no longer be immobilized.

5. The cloud system of claim 4, wherein the verification device is a mobile device of an owner or operator of the current vehicle.

6. The cloud system of claim 4, wherein the verification device is a dealer device of a dealer having serviced the current vehicle.

7. The cloud system of claim 4, wherein the mismatched controller is a TCU of the current vehicle.

8. The cloud system of claim 7, wherein the alert is sent from the current vehicle using the TCU, despite the TCU being the mismatched controller.

9. The cloud system of claim 7, wherein the alert is sent from the current vehicle to the cloud system from a mobile phone in communication with the current vehicle, without using the TCU of the current vehicle.

10. The cloud system of claim 7, wherein the alert is sent from the current vehicle to the cloud system from a Wi-Fi connection communication with the current vehicle, without using the TCU of the current vehicle.

11. The cloud system of claim 1, wherein indicating the clustered locations includes sending data indicative of the clustered locations to law enforcement to mitigate high crime areas.

12. The cloud system of claim 1, wherein indicating the clustered locations includes sending data indicative of the clustered locations to a vehicle insurance company for use in determining insurance rates.

13. A method for managing mismatched controller alerts performed by one or more hardware computing devices of a cloud system, comprising:
storing, to a component database of the cloud system, mismatched controller alerts received from a plurality of vehicles, each of the mismatched controller alerts indicating an identifier of a current vehicle that a mismatched controller is installed into and a location of the current vehicle responsive to the current vehicle identifying a mismatch of an identifier of the mismatched controller with an expected configuration of the current vehicle;
performing clustering of the mismatched controller alerts by the one or more hardware computing devices to correlate the mismatched controller alerts by location; and
indicating clustered locations of the mismatched controller alerts by the one or more hardware computing devices.

14. The method of claim 13, further comprising:
receiving, by the one or more hardware computing devices, an alert from the current vehicle, the current vehicle being immobilized due to a detection of the mismatched controller;
identifying, by the one or more hardware computing devices, a verification device corresponding to the current vehicle;
confirming, by the one or more hardware computing devices, the alert by sending a message to the verification device requesting authorization for installation of the mismatched controller; and
responsive to the mismatched controller being installed into the current vehicle being confirmed as being authorized, sending, by the one or more hardware computing devices, a message to the current vehicle to cause the current vehicle to no longer be immobilized.

15. The method of claim 14, wherein the verification device is one of:
a mobile device of an owner or operator of the current vehicle, or
a dealer device of a dealer having serviced the current vehicle.

16. The method of claim 14, wherein the mismatched controller is a TCU of the current vehicle.

17. The method of claim 16, wherein one of:
the alert is sent from the current vehicle using the TCU, despite the TCU being the mismatched controller;
the alert is sent from the current vehicle to the cloud system from a mobile phone in communication with the current vehicle, without using the TCU of the current vehicle; or
the alert is sent from the current vehicle to the cloud system from a Wi-Fi connection communication with the current vehicle, without using the TCU of the current vehicle.

18. The method of claim 14, wherein indicating the clustered locations includes sending data indicative of the clustered locations to law enforcement to mitigate high crime areas.

19. The method of claim 14, wherein indicating the clustered locations includes sending data indicative of the clustered locations to a vehicle insurance company for use in determining insurance rates.

20. A non-transitory computer-readable medium comprising instructions for managing mismatched controller alerts that, when executed by a cloud system having one or more hardware computing devices, cause the cloud system to perform operations including to:
store, to a component database, mismatched controller alerts received from a plurality of vehicles, each of the mismatched controller alerts indicating an identifier of a current vehicle that a mismatched controller is installed into and a location of the current vehicle responsive to the current vehicle identifying a mismatch of an identifier of the mismatched controller with an expected configuration of the current vehicle;
perform clustering of the mismatched controller alerts by the cloud system to correlate the mismatched controller alerts by location; and
indicate clustered locations of the mismatched controller alerts by the cloud system, including to send data indicative of the clustered locations to one or more of law enforcement to mitigate high crime areas or a vehicle insurance company for use in determining insurance rates.

* * * * *